April 5, 1960 A. J. CEGAN 2,931,923

ELECTRICAL CONTROL CIRCUIT

Filed Nov. 3, 1958

INVENTOR.
ALEX J. CEGAN

BY

ATTORNEY

United States Patent Office 2,931,923

Patented Apr. 5, 1960

2,931,923

ELECTRICAL CONTROL CIRCUIT

Alex J. Cegan, Norwalk, Conn., assignor to Eastern Industries, Incorporated, East Norwalk, Conn., a corporation of Delaware Application November 3, 1958, Serial No. 771,420

11 Claims. (Cl. 307—132)

Figure 1:
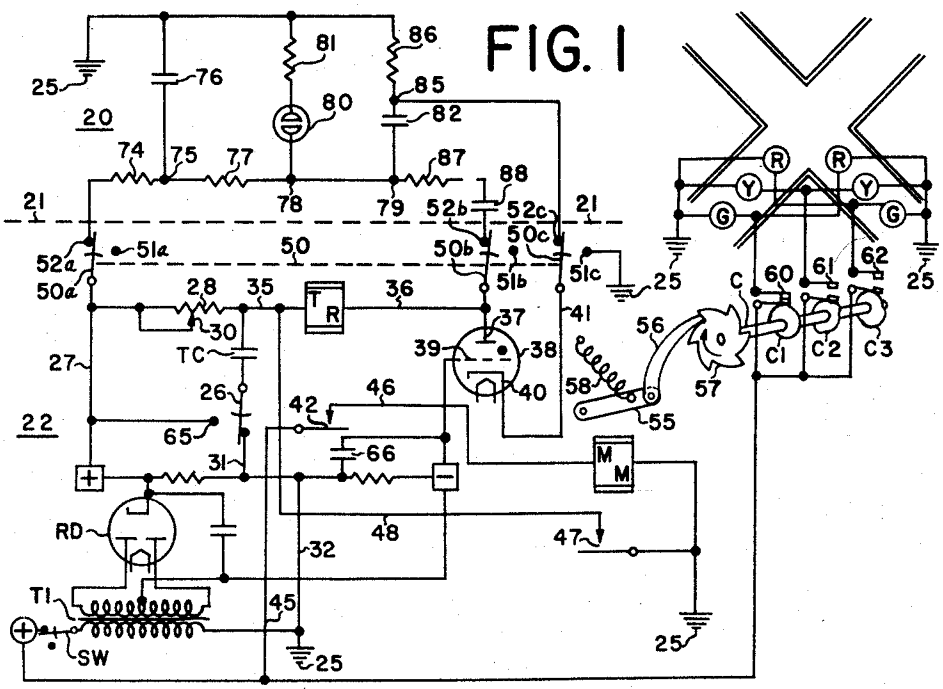

This invention relates to electrical circuits involving the timed control of electrical contacts, and more particularly relates to controlled pulsing to provide improved operation of an electronic timing circuit controlling electrical contacts.

From one aspect the invention is particularly applicable to electronic timing circuits for controlling electrical contacts carrying alternating current and where such electronic timing circuit employs direct current voltage having some alternating current (A.C.) ripple having a predominating component of frequency common to the alternating current controlled by the said contacts, and provides controlled periodic pulses to the timing circuit to insure random operation of the timing with respect to the alternating current and thus to improve operation of electrical contacts carrying such alternating current and controlled by such electronic timing circuit.

From another aspect the invention employs related periodic pulses to insure extinction of conduction in a gas filled electronic discharge tube of the heated filament type in connection with its warm-up period, to assure proper operation of an electronic timing circuit employing such tube, at the end of such warm-up period.

In its preferred form the present invention provides a combination of an electronic oscillator circuit and an electronic timing circuit cooperating together to produce more efficient timing of intervals particularly when the interval timed is of relatively short durations and also to substantially eliminate progressive migration of contact material in electrical contacts controlled by the timing circuit.

The combination of the electronic oscillator control circuit and an electronic timing circuit of the type described herein provides improved operation of the timing circuit in the control of electrical contacts such that undesirable characteristics of contact migration and premature conduction have been substantially eliminated.

This is of particular value in connection with timing circuits and electrical contacts controlling signal lamps in traffic signal systems for example as illustrated herein.

It has been found in a resistance-capacitance timing circuit employing a gas-filled electronic discharge tube as a time terminating element that there is sometimes present an undesirable A.C. ripple superimposed on the direct current (D.C.). This is particularly significant when this ripple is present in the D.C. voltage controlling the electronic trigger tube as controlled by the timing capacitor as such voltage approaches the point for triggering of the tube, since such ripple may then control the triggering of the tube.

Such ripple may arise by induction from nearby alternating current circuits or otherwise, but particularly when such ripple is from the same alternating current as controlled by the contacts for example, or has the same frequency as the latter, the triggering of the tube as the time terminating element will be controlled by the ripple by having the tube generally commence to conduct on the same half of the A.C. waves, and in many cases this will result in the electrical contacts controlled by the timing circuit making or breaking the alternating current predominantly on one half of the A.C. wave and thus on one polarity. Such condition results in excessive contact migration in the electrical contacts of relays and other switching devices controlled by the timing circuit.

Where the direct current supply for the timing circuit is derived by full wave rectification from the alternating current source, any A.C. ripple from this source alone is ordinarily of twice the frequency of the source and would ordinarily of itself not cause this condition. However, this condition may arise on half wave rectification or by induced currents as above noted, or otherwise.

For many purposes it is impractical to use adequate filtering or shielding of the direct current parts of such electronic timing circuit, to eliminate this ripple and the present invention has been found to be a convenient and low cost method of overcoming this, and thus to solve a troublesome problem in time controlled electrical contacts which is of particular importance in the reliability of public safety equipment such as traffic signal controllers for example.

Where a pair of contacts operates consistently or predominantly on the same portion of an A.C. wave and thus on the same polarity, contact migation tends to transfer contact material from one of the cooperating contacts to the other and thus to cause excessive build-up of material on one and the pitting of the other, which will eventually prevent the contacts from making and breaking properly.

The passage of heavy loads of current through electrical contacts and the use of an A.C. source having a frequency fundamentally common to the timing circuit and the circuit in which the electrical contacts are located, individually cause contact migration while the combination of the two said conditions aggravate contact migration between two electrical contacts.

Another difficulty in the operation of electronic timing circuits is sometimes referred to as premature conduction which is apt to occur in the gas tube of some RC electronic timing circuits, more particularly when the timing circuit is timing a relatively short interval, of the order of one to two seconds or less than the warm-up time of the tube for example, and when the tube serving as the time interval terminating element in the timing circuit, becomes conducting at a lower than normal plate potential and thus may continue to draw current from the low resistance circuit of the timing capacitor to maintain conduction, but such current is insufficient to operate a time terminating relay in the plate circuit, as will appear more fully described below.

It is an object of the invention to provide improved operation of an electronic timing circuit, obtaining its direct current operating voltage from rectification of alternating current, such improved operation being obtained by providing controlled pulsing in the timing circuit in random relation to such alternating current to disassociate the operation of the timing circuit from the alternating current for improving operation of electrical contacts controlled by the timing circuit.

It is also an object of this invention to present an electronic timing circuit in combination with a relaxation oscillator, the combination of which produces an improved electronic timing circuit with premature conduction controlled automatically to the extent that the effects of premature conduction have been substantially eliminated.

It is another object to present an improved electronic timing circuit, in combination with an oscillator control circuit, with contact migration substantially eliminated from its associated electrical contacts through which flows an alternating current source having a frequency fundamentally common to the alternating current associated with the electronic timing circuit.

Fig. 1 is a circuit diagram of a preferred form of improved electronic timing circuit which is illustrated operating a ratchet-wheel and cam assembly which in turn operates electrical contacts controlling signals which control the right of way of traffic at the intersection of two roadways.

Figure 2:
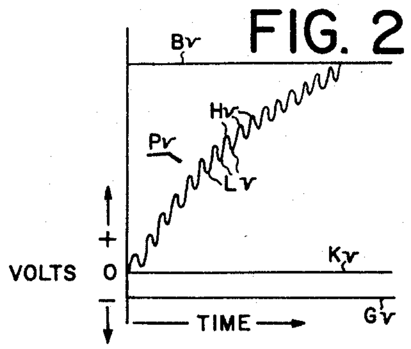

Fig. 2 is a graphic illustration of the increasing potential or voltage applied to the plate of a gas filled electronic discharge tube, as in a resistance-capacitance timing circuit, with the plate potential approaching and reaching the "breakdown" potential or voltage for conduction through the tube with such breakdown potential controlled by the grid bias of the tube, and with the actual point of conduction controlled by the A.C. ripple on the plate potential, where the timing circuit is supplied with direct current derived by rectification from an alternating current source.

Figure 3A:
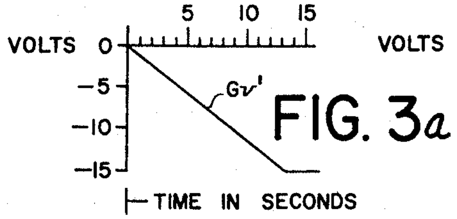

Fig. 3*a* is a graphic illustration of the increase in the negative D.C. potential applied to the grid of a tube when the A.C. power is first turned on and the rectifier tube for the D.C. power supply is in the process of being heated to normal operating temperature by the heater filament.

Figure 3B:
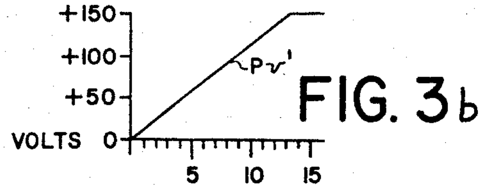

Fig. 3*b* is a graphic illustration of the positive D.C. potential that may be applied to the plate of a tube from the positive D.C. supply over the same period of time as the power supply rectifier tube is in the process of being heated, corresponding to the time illustrated above in Fig. 3*a*.

Figure 4:
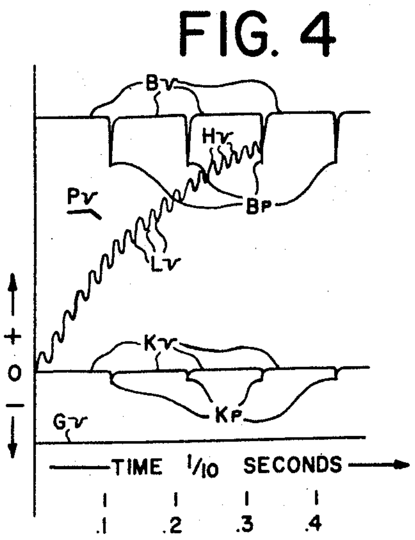

Fig. 4 is a graphic illustration of the increasing potential applied to the plate of a tube with the plate potential approaching the breakdown potential of the tube, while such breakdown potential is being reduced periodically by the periodically reduced bias caused by the negative pulsing of the cathode potential with a random relation to the A.C. ripple in accordance with one aspect of the invention.

Referring to Fig. 1 in more detail the preferred form of the invention is illustrated in schematic circuit form with the pulser, generally designated 20, located above the broken horizontal line 21. Below the broken horizontal line 21, and generally designated 22 is a timing circuit.

To the right of the timing circuit is a ratchet-pawl and cam wheel assembly operated cyclically step-by-step by energization of a relay or motor magnet MM as controlled by the timing circuit to cyclically alternate right-of-way at the intersection, illustrated above the cam wheel assembly, by sequential illumination of the red, R, yellow, Y, and green, G, signals.

In the lower left section of the timing circuit a full wave rectifiere is illustrated with an alternating current supply, indicated by a plus in a circle, a transformer T1, a dual rectifier diode tube RD and a positive direct current supply represented by a plus in a square, with a common ground return 25.

The switch SW, illustrated closed, represents an on-off switch by means of which the power may be turned off for the purpose of performing maintenance work. It should be understood that an on-off switch may be added to the power supply circuit for the signal lights so that the signal lamp power may be turned off when necessary.

An isolating gang switch 50, including individual switch sections 50*a*, 50*b*, and 50*c*, is illustrated with each switch connected to terminals 52*a*, 52*b* and 52*c* respectively. With the gang switch 50 as illustrated the pulser 20 is employed in association with the timing circuit 22.

With the gang switch 50 in its alternate position, so that the individual switches 50*a*, 50*b*, and 50*c* are connected to terminals 51*a*, 51*b* and 51*c* respectively the pulser is not connected to the timing circuit and the timing circuit will thus operate independently of the pulser.

Independent operation of the timing circuit, that is, with the gang switch 50 in its alternate position, will be described.

Attention is directed to the switch 26 in the timing circuit, illustrated connecting the timing capacitor TC to ground 25. With the switch 26 as illustrated the interval timed by the timing circuit will be timed by the charging of capacitor TC, from substantially ground potential, from the D.C. supply through lead 27, adjustable resistor 28, as determined by tap 30, timing capacitor TC, switch 26, leads 31, 32 to ground 25. As the charge on capacitor TC increases the potential applied to plate 37 of triode 38 increases. When the charge on capacitor TC, and thus the potential applied to plate 37 reaches the breakdown voltage of the tube 38 the tube passes current, the circuit being traced from the D.C. supply through lead 27, tap 30, the working part of adjustable resistor 28, lead 35, the coil of relay TR, lead 36, plate 37 of tube 38, cathode 40, lead 41, switch section 50*c*, terminal 51*c* to ground 25. With current flowing through the last described circuit the relay TR is energized resulting in closure of relay TR contact 42. Closure of contact 42 completes a circuit to energize relay or motor magnet MM from the A.C. supply through lead 45, contact 42, lead 46, the coil of motor magnet MM to ground 25. Energization of motor magnet MM causes closure of its contact 47 and shunts the coil of relay TR and tube 38, the shunting circuit including lead 48 and contact 47 to ground 25.

The capacitor TC is also discharged via a circuit that may be traced from the upper side of capacitor TC through lead 35, lead 48, contact 47, ground 25, lead 32, lead 31, switch 26 to the lower side of capacitor TC.

Completion of the shunting circuit deenergizes the relay TR, discharges the capacitor TC to substantially ground potential, and reduces the potential on the plate 37 to ground potential. Deenergization of relay TR opens contact 42 thus opening the energization circuit of motor magnet MM. Deenergization of motor magnet MM causes opening of contact 47 which opens the shunting circuit for the relay TR and tube 38 and opens the discharge circuit of the timing capacitor TC.

The timing capacitor TC begins to charge through the circuit previously described thus starting the timing of another interval.

Obviously through the use of multiple charging circuits including resistances of different values, selected as desired, the length of the timed interval may be varied as desired.

One of the uses of such timing circuit includes activation of an arm 55, in a downward direction by motor magnet MM upon its energization. The downward movement of the arm 55 draws the pawl 56 down to the next tooth on a ratchet wheel 57 and upon deenergization of the motor magnet MM the coil spring 58 returns the arm 55 to its upper position, as illustrated, with the pawl advancing the ratchet wheel part of a revolution in a step-by-step fashion.

The ratchet wheel may be used to drive a cam shaft C, on which may be found several cams, such as the three cams C1, C2 and C3 illustrated on cam shaft C. The cam wheels may be used to control contacts such as 60, 61 and 62 which are illustrated as controlling signals at the intersection of two roadways.

When contact 60 is closed as illustrated, a green signal G is illuminated for traffic on the main roadway and a red signal, R, is illuminated for traffic on the cross street for example. Closure of contact 61 illuminates a yellow signal Y to traffic on both roadways while closure of contact 62 illuminates a green signal G, on the cross street and a red signal R on the main roadway, for example.

Obviously, the contacts 60, 61, and 62, or additional contacts as controlled by additional cam wheels on shift C, may be used to energize relays or other repeating circuits, as desired.

With the switch 26 in its alternate position, i.e. connecting the lower side of capacitor TC to the D.C. supply, an alternate form of timing circuit is obtained. Operation of the alternate form of timing circuit differs somewhat from the operation of the timing circuit described above in that the timing capacitor is rapidly charged to the full extent of the ability of the D.C. supply and the interval of time is determined by the controlled discharge of the timing capacitor through a resistance.

When the potential on the upper side of the capacitor TC increases to the breakdown potential of the tube 38, the tube 38 passes current thus energizing relay TR. The circuit may be traced from the D.C. supply through lead 27, tap 30, resistance 28, lead 35, the coil of relay TR, lead 36, plate 37 of tube 38, cathode 40, lead 41, switch section 50c, terminal 51c to ground 25. Energization of relay TR results in closure of contact 42 and subsequent energization of motor magnet MM.

Energization of magnet MM results in closure of contact 47 which contact grounds the upper part of capacitor TC thus causing the capacitor to become rapidly recharged with the upper part of the capacitor at ground potential and the lower part of the capacitor at full positive potential. Closure of contact 47 also closes a shunting circuit for relay TR and tube 38 thus extinguishing the tube 38 and deenergizing the relay TR.

Deenergization of relay TR causes contact 42 to open and break the energizing circuit for motor magnet MM which magnet releases and opens contact 47 and permits the bleeding-off or discharging of the timing capacitor TC as previously described.

In some cases it may be necessary to supply a starting pushbutton (not shown) that when manually pushed to a close position, would shunt contact 47, for example, thereby applying a ground connection to the upper part of the capacitor TC through leads 48 and 35. Closure of contact 47 would be similar to closure of a starting or shunting pushbutton.

With a ground connection applied to the upper part of capacitor TC the capacitor TC would become fully charged. The lower part of the capacitor would be charged positively while the upper part would remain at ground potential so long as contact 47, or the starting or shunting pushbutton (not shown) were closed.

Opening of the pushbutton or contact 47, as the case may be, provides for bleeding-off or discharge of the capacitor TC through switch 26, terminal 65, lead 27, tap 30, resistance 28 to the upper side of capacitor TC.

Attention is directed to the power supply in which is developed a negative voltage, represented by a minus in a square, somewhat below ground potential. The negative voltage is employed to obtain the desired bias on the tube 38 by applying such negative potential to the grid 39 of tube 38. The value of the breakdown voltage necessary to cause the tube 38 to pass current is determined by the negative bias on the grid 39.

In some timing circuits a diode gas tube or flasher tube is employed in lieu of a triode gas tube. In such case no negative potential is needed and the anode to cathode voltage necessary to cause the diode to pass current would be a characteristic of the tube and could not be varied.

It is obvious that the output of the power supply must be of a value substantially in excess of the breakdown potential of the tube whether the tube be of the triode type or diode type.

The capacitor 66 in the grid circuit is used for filtering purposes to substantially filter out the A.C. ripple on the D.C. bias supplied to the grid. The negative D.C. supply is substantially reduced in magnitude as compared with the positive D.C. supply so that the A.C. ripple on the unfiltered negative D.C. supply is relatively small and negative D.C. supply may be filtered so that the potential applied to the grid 39 of tube 38 is relatively flat.

In both the above mentioned and described timing circuits, and in timing circuits similar to those described above, two undesirable characteristics exist. Contact migration, the transferring of metal from one metal contact to the other, of a pair of contacts and preconduction, the passage of insufficient or below minimum required current by the tube to operate the other components in the circuit, are two such undesirable characteristics.

Attention is directed to Fig. 2, a graph representing time, with respect to the horizontal, and voltage, with respect to the vertical, with zero voltage or ground potential and zero time marked by 0, positive voltage above the 0, increasing with height, negative voltage below the 0 increasing with depth, and time increasing to the right from zero.

The horizontal line Gv represents the negative potential applied to the grid, which potential for the purpose of illustration is assumed to be a substantially flat D.C. of −15 volts, for example.

The horizontal line Kv represents the cathode potential, here assumed to be at ground potential or zero voltage.

The horizontal line Bv represents the normal breakdown voltage of the tube, or the voltage level to which the plate potential must be increased before conduction occurs.

The exponential curve Pv represents the potential applied to the plate 37 of tube 38 in Fig. 1 as the timing capacitor TC is charged. For purposes of simplification the exponential curve Pv is expanded with time of the order of ½ second, for example. Obviously the time necessary for the curve Pv to increase to the value of the line Bv may be changed, as desired, by increase or decrease if the rate at which the timing capacitor is changed.

The exponential curve Pv represents increasing D.C. potential with a superimposed A.C. ripple, the ripple, here illustrated as a 60 cycle ripple for convenience, may be of the same frequency as the A.C. passing through the closed cam contacts controlling the signal lights or an harmonic of the A.C. in the signal circuits. Curve Pv increases positively rapidly due to the combined positive increase of the D.C. and the A.C. ripple going positive. The curve then decreases due to the A.C. ripple going negative. The points labeled Hv are the positive peaks of the ripple on the curve and the points Lv are the negative peaks of the ripple on the curve added algebraically with the increasing D.C.

It will be observed that as curve Pv approaches the value of the breakdown voltage Bv curve Pv will reach the value of Bv during the positive portion of the A.C. ripple wave at Hv.

Referring now to Fig. 1, in conjunction with Fig. 2, the gas filled discharge triode 38, which may be of the "Thyraton" type for example, will conduct when the potential on plate 37, represented by Pv, reaches the breakdown potential, Bv, of the tube. Thus as illustrated in Fig. 2 the tube will always start conducting on the positive portion of the A.C. ripple.

It may occur, in a timing circuit of the type illustrated and employing a triode of the "Thyraton" type for example, that due to adequate filtering and shielding the potential applied to the plate is a D.C. that is substantially free of any A.C. ripple but that such ripple may be present in the grid to cathode circuit. In such triode, because the ratio of the magnitudes of the breakdown voltage to the grid bias is 10 to 1, for example, which ratio is a characteristic of the tube, the grid to cathode circuit is very sensitive to any A.C. ripple present or to any modulation of the bias. Such modulation of the bias although ineffective in modulating the plate potential modulates the breakdown potential of the tube tenfold, and is effective in causing conduction of the triode during the same repeated portion of the A.C. ripple.

Referring back to Fig. 1 those skilled in the art will recognize the constant, direct time lag relation between energization of relay TR and energization of magnet MM with another constant time lag between closure of contact 42 and contact 47 and the eventual advancement of the ratchet wheel 57 effecting closure of contacts 60, 61 or 62 through which the common A.C. supply is fed to the signal lamps controlling the intersection.

Although the several time lags may not be jointly uniform, the time lags are individually uniform, thus resulting in closure of the different contacts at the same respective portion of the A.C. wave at all times, all initiated by the tube 38, which starts passing current at the same portion of the A.C. wave each time such passage of current occurs.

Preconduction, the condition in which a tube does not pass sufficient current to properly operate the relay, for example, may arise when the timing circuit power supply has just been turned on, or a tube has just been replaced, and the tube or tubes are improperly heated or not heated to their efficient operating temperature.

For the purpose of description, consider the timing circuit as illustrated in Fig. 1 and assume that the normal operating grid bias of the triode 38 is −15 volts, for example, and that the ratio of the magnitudes of the breakdown voltage to the grid bias is ten to one, for example, with the minimum voltage for maintaining conduction at +90 volts and the minimum breakdown voltage at +100 volts, for example. The above ratio implies the normal operating breakdown voltage is +150 volts.

Assume the rectifier tube in the power supply is initially turned on and is warming up. The cold condition of the rectifier tube would result in a reduced output of the power supply. Thus both the positive output and the negative output would build up from zero proportionally with respect to the individual normal potentials.

Referring to Fig. 3*a* and Fig. 3*b* a graphic representation of the increase of the potential on the grid (Fig. 3*a*) and the potential on the plate (Fig. 3*b*) is individually illustrated on a common time basis, which time may be on the order of seconds, for example.

Fig. 3*a* illustrates the negative potential build-up applied to the grid starting at time zero and voltage zero. The line $Gv'$ illustrates the increase of the negative voltage with respect to time so that after eight seconds, for example the potential applied to the grid may be of the order of −10 volts for example, with the normal operating grid voltage at −15 volts, for example.

Fig. 3*b* illustrates the positive potential build-up of the positive output starting at time zero and voltage zero. The line $Pv'$ illustrates the increase of the positive output voltage with respect to time, common to both figures, so that after the same eight seconds, for example, the positive output that may be applied to the plate may be of the order of +100 volts for example.

If the interval to be timed is relatively short, of the order of one to two seconds or less for example, the timing resistance would be of such value as to permit the timing capacitor to become charged to the normal breakdown potential (+150 volts, for example) in the desired time.

Under the assumed conditions after eight seconds, for example, the potential applied to the grid would be pproximately −10 volts which would require a potential of the +100 volts applied to the plate to permit the tube to pass current. Since there would be +100 volts applied to the plate after eight seconds the tube would pass current. With the grid bias and breakdown voltage less than normal and the tube thus passing current, the current flow would be insufficient to energize the relay (TR) and the relay would fail to close its contact (42) thus ending the chain reaction to properly terminate the time interval.

Since the voltage across the tube necessary to maintain conduction is substantially less than the necessary breakdown voltage to start conduction the current flow through the tube will remain inadequate to energize the relay but will remain adequate to keep the triode conducting.

Past experience has resorted to manual operation of the relay TR of Fig. 1, to terminate the interval and end the condition of insufficient current conduction.

The triode 38 may continuously conduct reduced current if its own filament is not fully heated. The negative grid bias may reach normal operating value, and the potential at the plate be equal to the breakdown potential to cause the tube to pass current but due to a subnormal operating temperature of the tube 38 the tube will pass insufficient current to operate the relay TR.

Likewise, it has been found that when tubes, such as triode 38, age the tubes are prone to preconduct, therefore passing insufficient current to energize the relay TR.

Of course, any single condition or a combination of two or more conditions disclosed above may combine to cause preconduction.

When the pulser, generally described 20, in Fig. 1 is employed in combination with a timing circuit, as illustrated in Fig. 1, the undesirable conditions resulting from the characteristics mentioned above are substantially eliminated from the electronic timing circuits of the type described herein and similar types thereto.

Referring again to Fig. 1, with the gang switch 50 adjusted as illustrated, with the individual switch sections **50*a*, 50*b* and 50*c* in contact with terminals 52*a*, 52*b* and 52*c* respectively, the positive output of the D.C. supply is connected to one side of a resistance 74 via lead 27, switch section 50*a*, and terminal 52*a*, the other side of resistance 74 is connected to junction 75. Junction 75 is connected in common to capacitor 76 and resistance 77, with capacitor 76 connected to ground 25 and resistance 77 connected to junction 78**.

The circuit through junction 78 follows through a neon tube 80 and resistance 81 to ground 25. Junction 78 is also connected to junction 79 the circuit following through capacitor 82, junction 85 and resistance 86 to ground 25.

Junction 79 is connected to resistance 87 and through capacitor 88, terminal **52*b*, switch section 50*b* to plate 37 of triode 38. Junction 85 supplies substantially a ground connection from ground 25 through resistance 86, junction 85, terminal 52*c*, switch section 50*c*, lead 41 to cathode 40**.

Positive D.C. is applied through lead 27, switch section **50*a*, terminal 52*a*, resistance 74, junction 75, resistance 77, junction 78 and 79 to capacitor 82, the circuit being completed through resistance 86 to ground 25, to charge capacitor 82. The resistances 74 and 77 determine the rate at which the capacitor 82 is charged. The capacitor 76 is used as a filter to substantially reduce the A.C. ripple on the D.C. applied to charge capacitor 82**.

With the capacitor 82 substantially at ground potential, a maximum amount of D.C., when first applied to last described circuit, flows through the circuit with a maximum of current passing through resistance 86. As the charge on the capacitor 82 increases, thus increasing the voltage across the capacitor, the current flow through the capacitor decreases thus the current flow through resistance 86 is reduced to a small fraction of the initial surge also reducing the voltage across the resistance 86 to substantially ground. With the voltage across the resistance 86 reduced to ground potential the upper side of capacitor 82, connected to junction 85 is essential at ground potential and is negative with respect to the side of the capacitor 82 connected to junction 79. Likewise, the upper electrode of the neon tube 80, connected to resistance 81 is essentially at ground potential since there is no current flow through resistance 81 and therefore no voltage across the resistance 81. Since the capacitor 82 and the neon tube 80 are effectively in parallel with respect to ground, the voltage building up across capacitor 82 is also appearing across the neon tube 80. When the voltage across the neon tube reaches the breakdown potential of the tube, the tube conducts current thereby reducing the charge on the capacitor 82 until the potential across the tube is reduced to a value which will not maintain conduction.

The capacitor 82 is discharged from the positive side of the capacitor 82 through junction 79, junction 78, neon tube 80, resistance 81, resistance 86, junction 85 to the negative side of the capacitor 82. The resistances 81 and 86 determine the rate at which the capacitor is discharged. The value of the resistances 81 and 86 in the discharging circuit and the value of resistances 74 and 77 in the charging circuit can be such that the charging of capacitor 82 from the D.C. supply and the subsequent discharging through the neon tube occurs at a predetermined rate, approximately 11 times per second, for example.

As current flows from the positive side of capacitor 82 to the negative side, through the described circuit, a voltage drop of the order of one volt, for example, is developed across the resistance 86. Resistance 86 is in the cathode 40 circuit, previously described, and the current flow through such resistance is in such direction that the voltage pulse applied to junction 85, and thus to cathode 40, is negative during the instant the capacitor 82 is discharging. During the period of the charging of capacitor 82 the current flow through resistance 86 is so small that the voltage across the resistance is substantially zero, with respect to ground, thus placing the cathode 40 at ground potential.

Thus a negative pulse of approximately one volt is applied to cathode 40 effecting a reduction of bias of tube 38 of one volt. Reduction of bias by one volt causes reduction of the breakdown potential of tube 38 by 10 volts.

It should be noted that the capacitor 82 was originally assumed to be at ground potential before the initial charging of the capacitor occurred. Subsequent discharging of capacitor 82 through the neon tube during normal operation, as described above, does not reduce the charge on the capacitor 82 to ground potential but only to a minimum value whereby conduction through the neon tube can no longer be maintained. This minimum value voltage depends on the characteristics of the neon tube and may be of the order of +50 volts, for example, while the voltage necessary to start conduction, also a characteristic of the tube, may be of the order of +62 volts, for example. Therefore, subsequent charging of capacitor 82, after the initial charging would start with the capacitor substantially above ground potential.

As timing capacitor TC of timing circuit 22 is charged, as described above, the potential applied to the lower plate of capacitor 88 is increased by the increasing potential applied to plate 37. Simultaneously, as capacitor 82 is charged, as described above, the potential applied to the upper plate of capacitor 88 is increased by the increased potential applied to the lower electrode of neon tube 80, connected to junction 78.

Since the timing capacitor TC is charged to a greater voltage than the capacitor 82 the potential applied to plate 37 of triode 38 is greater than the potential applied to the lower electrode of the neon tube 80. The effect of the individual potentials on the capacitor 88 is to charge both plates of the capacitor positively with respect to ground. However, the lower plate of the capacitor 88 effected by the potential applied to the plate 37 of tube 38 has a higher positive potential applied to such lower plate than the upper plate of capacitor 88, which is effected by the positive potential applied to the lower electrode of the neon tube 80. Thus although both plates of the capacitor 88 are charged positively with respect to ground the lower plate is more positive than the upper plate.

When capacitor 82 discharges through the neon tube 80 the potential applied to the lower electrode of neon tube 80 decreases rapidly thus the potential on the upper plate of capacitor 88 also decreases. The capacitor 88 does not discharge rapidly and tends to maintain the voltage drop across the capacitor 88 momentarily.

When the capacitor 82 discharged through neon tube 80, as described, the voltage across capacitor 82 decreased rapidly; the potential applied to the lower electrode of neon tube 80 decreased rapidly, and the potential on the upper plate of capacitor 88 decreased rapidly. However, the voltage across capacitor 88 does not change because the capacitor does not discharge.

Since the voltage drop from junction 85 across capacitor 82, resistance 87 and capacitor 88 equals the voltage drop across the tube 38 i.e. between plate 37 and cathode 40, and the voltage drop from junction 85 to across capacitor 88, as described, decreases rapidly, the voltage drop across the tube 38 also decreases rapidly. This rapid voltage drop decreases across the tube 38 appears as a negative pulse applied to the plate 37 of tube 38.

Almost immediately after the voltage drop across the tube decreases the voltage drop is restored to its original value since capacitor 88 only transmits rapid voltage variations such as the rapid discharge of capacitor 82 and not the relatively slow charging of capacitor 82.

The pulser therefore applies two periodic negative voltage pulses to a timing circuit. One negative pulse is applied to the cathode 40 of tube 38 the other negative pulse delayed of the order of one millisecond, for example, being applied to the plate 37 of tube 38.

The negative pulse, of the order of one volt, for example, periodically applied to the cathode 40 will eliminate contact migration by causing the triode to fire randomly with respect to the A.C. ripple and will not always fire on the positive half of the A.C. ripple.

Generally, when the negative voltage pulse is applied to the cathode of a triode, the grid to cathode voltage is decreased by the magnitude of the pulse during the instant the pulse occurs. The decreased grid to cathode voltage causes the tube to have a reduced breakdown voltage during the instant the applied pulse occurs. This action and reaction is graphically illustrated in Fig. 4.

Fig. 4 represents graphically voltage, represented on the vertical line, and time, represented on the horizontal with zero voltage and zero time represented at the junction of the line Pv and Kv with the vertical line where the "0" is located. Above the "0" the voltage increases positively, as indicated by a plus and an arrow, and below the "0," the voltage increases negatively, as indicated by a minus and an arrow.

Time ismeasured off in $\frac{1}{10}$ seconds along the horizontal.

The horizontal line Gv represents the potential, in volts, applied to the grid, which potential is negative and is relatively constant. A similar label is employed for grid potential in Fig. 2.

The horizontal line Kv in Fig. 4 appears broken by the downward thrusting points Kp, the points Kp occurring every $\frac{1}{11}$ of a second, for convenience of illustration. The line Kv represents the normal cathode potential, in volts, which is assumed to be at ground or zero voltage with the points Kp representing the negative voltage pulses applied to the cathode. As each negative voltage pulse is applied to the cathode, as indicated by points Kp, the potential applied to the cathode is momentarily increased negatively and again decreased toward zero at termination of the pulse.

The negative voltage pulses, Kp, reduces the bias, as determined by the potential difference between the potential applied to the grid and the potential applied to the cathode, each time the negative voltage pulse is applied to the cathode. The label Kv is also employed in Fig. 2 to represent a cathode potential.

The horizontal lines $B_v$ represents the normal breakdown potential as determined by the normal bias of the tube. The points $B_p$ along the line $B_v$, represent the sudden momentary reduction of the breakdown potential, as caused by the reduction in the bias at point $K_p$ on line $K_v$.

The label $B_v$ is used in Fig. 2 as well as in Fig. 4 to represent the breakdown potential of a tube.

The curve $P_v$ in Fig. 4 represents the increasing positive voltage potential applied to the plate, which potential increases as the timing capacitor TC is charged. Both the charge on the timing capacitor TC and the potential on the plate 37 increase with time. The curve $P_v$ is illustrated greatly enlarged and represents an increasing D.C. voltage on which is superimposed an A.C. ripple indicated by low peaks $L_v$ of the A.C. ripple, and high peaks $H_v$ of the A.C. ripple.

With the pulses $K_p$ periodically applied to the cathode at approximately one pulse every one-eleventh of a second, for example, the pulses are out of synchronization with the frequency A.C. ripple and the breakdown potential points $B_p$, reduced by the pulses $K_p$, occur randomly with respect to the A.C. wave.

It will be found that the individual pulses on the tube are ineffective until the potential applied to the plate of the tube approaches the normal breakdown potential voltage of the tube.

It will be noticed that as the curve $P_v$ generally increases in potential, with time, and approaches the breakdown potential $B_v$, the A.C. ripple, being of somewhat smaller amplitude than the periodically reduced breakdown potential points $B_p$, no longer controls the firing of the tube with respect to wave of the A.C. ripple. The reduced breakdown potentials $B_p$ at the .11 second mark is substantially separated in value from the $H_v$ portion of the curve $P_v$ while the point $B_p$ at the .22 second mark is somewhat closer in value, with respect to voltage applied to the plate as the curve $P_v$ increases in value with time. The point $B_p$ at the .33 second mark however reduces the breakdown potential to some value below the assumed value of the curve $P_v$ thus causing the tube to fire regardless of the portion of the A.C. ripple found by the momentarily reduced breakdown potential.

The negative pulse applied to the plate 37 of tube 38 of the order of approximately minus twelve volts, for example, reduces the voltage applied to the plate 37 so that if premature conduction should occur in tube 38 the negative voltage pulse applied to the plate 37 would reduce the applied voltage to below the minimum voltage necessary to maintain conduction thus extinguishing the tube and although not preventing preconduction, eliminates continued conduction of the tube at or near minimum voltage conditions.

The negative pulse causes the tube to cease conduction, when conduction occurs under premature conditions or minimum voltage conditions and permits the tube to either heat to full operating temperature or, as illustrated in Fig. 3*a*, holds the tube shut off so that the grid potential $G_v'$, can increase.

Although the preferred method of control of contact migration includes continued application of negative pulses to the cathode of a triode in a timing circuit, as described above an alternate method of control of contact migration includes the continued application of positive pulses to the grid of a triode in a timing circuit in lieu of applying negative pulses to the cathode.

Application of a positive pulse to the grid circuit in lieu of application of a negative pulse to the cathode circuit may be obtained by modifying the cathode and grid circuit illustrated in Fig. 1.

That part of the cathode circuit illustrated as returning the cathode to ground through terminal **52*c*, junction 85 and resistance 86 would be disconnected so that terminal 52*c* does not connect with junction 85 and terminal 52*c* would be connected directly to ground 25** thereby maintaining the cathode at constant ground potential.

The positive pulse, which would be similar to the negative as described applied to the cathode circuit except that the pulse is positive instead of negative, would be picked off the lead of the relaxation oscillator circuit between the upper electrode of neon tube 80 and resistance 81.

The positive pulse upon the grid causes a reduction, toward zero voltage, of the potential applied to the grid and therefore reduces the bias of the tube. Reduction of the bias of the tube reduces the breakdown potential of the tube, as previously explained relative to applying a negative pulse to the cathode.

The positive pulse, picked off the lead of the relaxation oscillator between the upper electrode of the neon tube 80 and the resistance 81, would be fed through a blocking capacitor and a limiting resistance to the grid 39 of tube 38. The blocking capacitor would hold the grid normally negative by blocking the D.C. negative potential applied to the grid but would pass the positive pulse to the grid 39. The limiting resistance would limit the amplitude of the positive pulse.

Controlled periodic positive pulsing of the grid in lieu of controlled periodic negative pulsing of the cathode may be illustrated graphically by slightly modifying the graphic illustration presented in Fig. 4. Such modification would show the line $K_v$ horizontal and unbroken by the pulse points $K_p$ indicating a steady ground potential or zero voltage applied to the cathode. The horizontal line $G_v$ would be interrupted by positive going pulses, similar to the negative pulses labeled $K_p$ except that the positive going pulse would extend upward, toward the "0" level from the line $G_v$. The positive going pulses appearing along the line $G_v$ would appear to be approximately of the same magnitude as the pulse $K_p$, except positive instead of negative and at the same rate in relation to time.

It was previously mentioned that the combined resistance of 74 and 77 in Fig. 1 control the rate at which capacitor 82 is charged from the predetermined positive D.C. supply. The combined resistance of 81 and 86 control the rate at which capacitor 82 is discharged. The value of the charge at which the discharge of capacitor 82, through neon tube 80, commences is determined by the characteristics of the neon tube 80 which characteristics are here assumed to be of the order of +62 volts for breakdown potential, for example and +50 volts minimum voltage for maintaining conduction through the tube, for example. With the assumed figures capacitor 82 will charge to +62 volts at which value neon tube 80 will become conductive. When the charge on capacitor 82 is reduced to +50 volts neon tube 80 will cease to be conductive and capacitor 82 will begin to recharge from +50 volts to +62 volts at which neon tube 80 will again conduct current.

The preferred amplitude of the negative pulse applied to the cathode through the circuit from junction 85 through terminal **52*c*, switch 50*c*, lead 41 to cathode 40** is of the order of .9 volt for example, with a time constant of the order of .1 millisecond, for example, for the length of the pulse, with a recurring time factor of the order of every .11 of a second for example.

With the frequency of the pulse applied to the cathode out of synchronization with the frequency of the A.C. ripple random firing of the tube 38, with respect to the A.C. ripple, is assured.

It is obvious to those skilled in the art that should the alternate method of control of contact migration be employed and a positive pulse be applied to the grid of tube 38 from the lead between the upper electrode of neon tube 80 and the resistance 81 in lieu of applying a negative pulse to the cathode 40 from junction 85, the positive pulse picked off at the said lead would be at the same frequency as the negative pulse picked off at junction 86 but would be of a greater amplitude. The limiting resistance, that would be placed in the grid circuit through which the positive pulse would be applied to the grid, would determine the amplitude of the pulse so that the amplitude of such positive pulse applied to the grid 39 would be substantially equal to the amplitude of the negative pulse as described above.

Referring to the control of contact migration between electrical contacts associated with the electronic timing circuit, in particular, contact migration may be controlled by controlled periodic positive pulsing of the plate 37 of tube 38 as may be illustrated by slight modification of the circuit diagram in Fig. 1.

The modification would include the opening of switch section 50*b* so that switch 50*b* would be connected to terminal 51*b*, the switch section 50*c* would be opened so that switch 50*c* would be connected to terminal 51*c* which terminal is connected to ground 25.

In lieu of applying a negative pulse to the cathode 40, since the pulsing circuit is now broken by open switch 50*c* a positive pulse, picked off the lead between the upper electrode of neon tube 80 and resistance 81, would be fed through a capacitor to the plate 37 of tube 38.

A positive pulse, of the order of 10 volts, for example, the amplitude being determined by the values of the components of the oscillator circuit, may be applied to the plate 37 of the tube 38, which positive pulse may be represented by slightly modifying the curve P*v* in Fig. 4, for example.

The horizontal lines K*v* and B*v* would appear unbroken by points K*p* and B*p* respectively because of the absence of the pulses applied to the cathode 40. Upon the curve P*v*, at .11 second, .22 second and .33 second would appear a positive going point, representing the positive pulse with an amplitude equal to the amplitude of the points B*p*, now illustrated, for example.

The points on the curve P*v* would extend upward from whatever portion of the A.C. wave is at the .11 second mark, .22 second mark and .33 second mark respectively.

Applying such a positive pulse to the plate 37 would cause the tube to fire randomly with respect to the A.C. wave since the pulse, represented by the point would first reach the line B*v*, the breakdown potential voltage of the tube.

Referring now in general to the pulsing of the cathode, as in the preferred method of control of contact migration, or the alternate methods, the pulsing of the grid or the pulsing of the plate of a gas filled discharge tube, all as described above, it will be obvious that the frequency at which the pulses are applied to any part of the tube must be out of synchronization with the A.C. source or any A.C. ripple present in the timing circuit or its associated circuits.

This non-synchronized condition provides movement of the applied pulse with respect to the A.C. wave and permits the breakdown potential to be reached by the plate potential randomly with respect to the A.C. wave.

It will also be obvious that the frequency of the applied pulse must be such that the potential applied to the plate is prohibited from reaching the breakdown potential of the tube between any two consecutive pulses, on the shortest interval to be timed by the timing circuit.

In the preferred form pulses applied to the grid circuit at a frequency of the order of from 9 to 11 pulses per second, at an amplitude of the order of from 1 to 1.5 volts, effecting reduction of the breakdown potential of the order of from 10 to 15 volts, are of sufficient frequency and amplitude to effect random firing of a gas filled discharge tube, with respect to the A.C. wave, for timing intervals of the order of one second.

It should be understood that the expressed values peculiar to the invention are given by way of example with no intention of limiting the invention to such values.

Although some variations and modifications of the present invention have been illustrated and described it will be obvious to those skilled in the art that other changes in form, arrangement and connection of the various elements and substitution of equivalent components may be made without departing from the spirit of the invention within the scope of the appended claims.

I claim:

1. An electrical circuit for time control of electrical contacts for carrying alternating current, said circuit employing in its operation a direct current voltage having some A.C. ripple including a predominating alternating current component of the same frequency as that of the first said alternating current, means for varying the charge on said capacitor from an initial value to a different final value for timing, means including an electronic trigger tube controlled by the charge on said capacitor for triggering at a particular charge and corresponding direct current voltage in desired relation to said final value for controlling said electrical contacts but sensitive to the presence of said A.C. ripple by triggering on a particular polarity of said alternating current component, and means for applying periodic pulses to said tube in variable relation to said alternating current to dissociate said triggering from any particular polarity of said alternating current for improving operation of said electrical contacts in variable relation to the alternations of polarity of the alternating current.

2. A combination as in claim 1, and in which said trigger tube includes an anode and cathode and a grid which controls the triggering voltage at which the anode-cathode circuit triggers by abruptly changing its construction characteristics, said pulsing means including means for applying brief voltage pulses to said tube to shift its triggering voltage momentarily toward said initial value by a small amount sufficient to exceed any voltage effect on said tube from said A.C. ripple.

3. A combination as in claim 2, and in which said brief voltage pulses are applied to the grid-cathode circuit to reduce the grid bias and consequently reduce the triggering voltage for the anode-cathode circuit in greater degree.

4. A combination as in claim 3, and in which said brief voltage pulses are applied negatively to the cathode with respect to ground to shift the cathode toward the grid in potential.

5. A combination as in claim 1 in which said pulsing means includes an electronic oscillator having an output of low frequency relative to the frequency of said alternating current and a circuit connecting a part of said output in desired polarity relation to said trigger tube to periodically momentarily reduce its triggering voltage in variable relation to said alternating current and in sufficient magnitude to overcome said ripple.

6. A combination as in claim 5 and in which said trigger tube is a gas filled tube having a control grid and an anode and cathode circuit triggered into conduction only above a critical voltage controlled by bias of said grid and having its anode-cathode voltage controlled progressively by the charge on said capacitor, said connecting circuit applying said pulses to said tube to trigger the latter in cooperation wtih the charge on said capacitor closely approaching said particular charge and the anode-cathode voltage correspondingly approaching said critical voltage in advance of any possible triggering by any additive effect of said A.C. ripple to said anode-cathode voltage.

7. A combination as in claim 6 and including a relay controlled by said anode-cathode circuit and an alternating current switching device including said electrical contacts and controlled by said relay.

8. A combination as in claim 1 in which said pulsing means includes an electronic oscillator having an output of low frequency relative to the frequency of said alternating current and a circuit connecting a part of said output in desired polarity relation to said trigger tube to periodically momentarily reduce its triggering voltage in variable relation to said alternating current and in sufficient magnitude to overcome said ripple, and in which said trigger tube is a gas filled tube having a control grid and an anode and cathode circuit triggered into conduction only above a critical voltage controlled by bias of said grid and having its anode-cathode voltage controlled by progressively the charge on said capacitor but on which the grid loses control upon such conduction until the anode-cathode voltage is below a second lower cut-off value, and means including said oscillator and a further connecting circuit to apply further periodic pulses related to the first but for momentarily depressing the anode-cathode voltage below said cut-off value when it is conducting near said value.

9. An electrical circuit for timed control of electrical contacts carrying alternating current, said circuit including a capacitor, a circuit including a resistance for controlling said capacitor from a source of direct current to vary the charge and corresponding voltage on the capacitor progressively from an initial value to a different final value fortiming, a grid controlled gas filled electronic discharge tube having an anode-cathode circuit whose ionization voltage for conduction is controlled by said grid intermediate said initial and final values and whose cut-off voltage from such conduction to non-conduction, is substantially lower than said ionization voltage, the anode-cathode circuit having its voltage controlled progressively by said varying voltage on said capacitor for such timing and for triggering by reversal of non-conduction and conduction conditions to terminate such timing such that the time of such triggering is controlled in part by any alternating current component which may be present in said timing circuit and corresponding to the alternating current controlled by said contacts, a relay controlled by said anode-cathode circuit and switching means controlled by said relay and including said electrical contacts, a relaxation oscillator, circuit means for deriving periodic pulses from said oscillator of random relation to said alternating current and for applying said pulses to the grid-cathode circuit of said tube to momentarily reduce said ionization voltage by an amount exceeding said alternating current component.

10. An electrical circuit as in claim 9, and including further circuit means for deriving further related periodic pulses from said oscillator and for applying said related pulses to said anode-cathode circuit for momentarily depressing the voltage thereof below said cut-off voltage when the anode-cathode voltage approximates said cut-off voltage as when the tube has just heated up with power recently applied to the tube.

11. In an electrical timing circuit employing direct current voltage in its operation and subject to A.C. ripple having a predominating alternating current component of a given frequency on the direct current and controlling electrical contacts for carrying alternating current having the same frequency as said component and said circuit having a capacitor and a control circuit for progressively varying the charge on said capacitor from an initial value to a different final value for timing purposes and triggering output means for operating to control said electrical contacts in response to such charge on said capacitor reaching a predetermined value between said initial value and said final value and such operation of said triggering output means being sensitive to said A.C. ripple so as to be subject to triggering on one half of the alternating current wave more generally than on the other half of such wave from such ripple, the improvement comprising means for applying pulses periodically to said timing circuit in variable relation to said alternating current wave to release the triggering output means from such control by said A.C. ripple, whereby migration of contact material between said electrical contacts will be minimized by making control of the contacts substantially random with respect to the alternating current controlled thereby.

No references cited.